US012778031B2

United States Patent
Kamp

(10) Patent No.: US 12,778,031 B2
(45) Date of Patent: Nov. 3, 2026

(54) METHOD OF CULTIVATING PLANTS AND SYSTEM THEREFOR

(71) Applicant: Priva Holding B.V., De Lier (NL)

(72) Inventor: Petrus Gerardus Hendrikus Kamp, Amersfoort (NL)

(73) Assignee: Priva Holding B.V., De Lier (NL)

(*) Notice: Subject to any disclaimer, the term of this patent is extended or adjusted under 35 U.S.C. 154(b) by 21 days.

(21) Appl. No.: 18/286,035

(22) PCT Filed: Apr. 6, 2022

(86) PCT No.: PCT/NL2022/050190
§ 371 (c)(1),
(2) Date: Oct. 6, 2023

(87) PCT Pub. No.: WO2022/216152
PCT Pub. Date: Oct. 13, 2022

(65) Prior Publication Data

US 2024/0188510 A1 Jun. 13, 2024

(30) Foreign Application Priority Data

Apr. 7, 2021 (NL) ..................................... 2027936

(51) Int. Cl.

| | |
|---|---|
| ***A01G 9/26*** | (2006.01) |
| ***A01G 9/18*** | (2006.01) |
| ***A01G 9/24*** | (2006.01) |
| ***A01G 13/10*** | (2006.01) |

(52) U.S. Cl.
CPC ................. *A01G 9/26* (2013.01); *A01G 9/18* (2013.01); *A01G 9/247* (2013.01); *A01G 13/10* (2013.01)

(58) Field of Classification Search
CPC . A01G 9/26; A01G 9/18; A01G 9/247; A01G 13/10; A01G 31/008; A01G 7/02; A01G 9/24
See application file for complete search history.

(56) References Cited

U.S. PATENT DOCUMENTS

2017/0032258 A1* 2/2017 Miresmailli ............. G06N 5/04
2017/0035002 A1* 2/2017 Ellins ..................... A01G 31/02
2017/0161560 A1 6/2017 Itzhaky et al.
(Continued)

FOREIGN PATENT DOCUMENTS

CN 107864850 A 4/2018
EP 1220121 A1 7/2002
(Continued)

OTHER PUBLICATIONS

PCT International Search Report and Written Opinion, PCT/NL2022/050190, Jul. 4, 2022, 11 pages.

*Primary Examiner* — Trinh T Nguyen
(74) *Attorney, Agent, or Firm* — Quarles & Brady LLP

(57) ABSTRACT

The disclosure relates to a method of cultivating plants comprising supplying at a given time a quantity of a plant protection product and/or plant growth regulator to the plants, wherein said quantity is adapted based on a prediction of a physiologic state of the plants at a time in the future relative to the given time, and is compensated for a difference between an indication of the real physiologic state of the plants at a time in the past relative to the given time and a theoretical physiologic state of the plants for said time the past.

10 Claims, 1 Drawing Sheet

(56) References Cited

U.S. PATENT DOCUMENTS

| | | | | |
|---|---|---|---|---|
| 2023/0143014 | A1* | 5/2023 | Nguyen ................. | A01G 15/00 47/17 |
| 2023/0384279 | A1* | 11/2023 | Venkatesalu ............ | A01G 7/02 |

FOREIGN PATENT DOCUMENTS

| | | | |
|---|---|---|---|
| WO | 2016189477 | A1 | 12/2016 |
| WO | 2019162192 | A1 | 8/2019 |

* cited by examiner

METHOD OF CULTIVATING PLANTS AND SYSTEM THEREFOR

CROSS-REFERENCE TO RELATED APPLICATIONS

This application represents the U.S. national stage entry of International Application No. PCT/NL2022/050190 filed Apr. 6, 2022, which claims priority to Netherlands Patent Application No. NL 2027936 filed Apr. 7, 2021, the disclosures of which are incorporated herein by reference in their entirety and for all purposes.

FIELD OF THE INVENTION

The present invention relates to a method of cultivating plants, in which a plant protection product and/or growth regulator is supplied to the plants for controlling a development of the plant and/or its environment. The invention further relates to a system including a greenhouse and a control apparatus adapted for carrying out the method.

BACKGROUND OF THE INVENTION

The cultivation of plants, for example in greenhouses or open fields, may involve the supply of plant protection products to control pests. Also, plant growth regulators may be used to control the development of the plants. It is observed that known methods supply plant protection products and plant growth regulators in excess to the plants, to assure adequate effectiveness. Such approach is rather wasteful, and an inefficient use of resources.

SUMMARY OF THE INVENTION

It is therefore an object of the invention to minimize the supply of such compounds while also improving the effectiveness of the plant protection products and plant growth regulators. To this end, according to a first aspect, the invention provides a method of cultivating and protecting plants, comprising supplying, at a given time, a quantity of a plant protection product and/or plant growth regulator to the plants, wherein said quantity is adapted based on a prediction of a, e.g. physiologic, state of the plants at a time in the future relative to the given time, and is compensated for a difference between an indication of the real, e.g. physiologic, state of the plants at the given time or a time in the past relative to the given time and a theoretical, e.g. physiologic, state of the plants for the given time or said time the past. Hence, plant protection product and/or plant growth regulator can be provided to the plants at the given time in an amount that is tailored to the plants' receptivity to the plant protection product and/or plant growth regulator at the time in the future, taking into account a time delay between the time of supply to the plant and the time of effective receipt by the plant of the plant protection product and/or plant growth regulator. In particular, the method enables to account for a time delay between the time at which the plant protection product and/or plant growth regulator is supplied to the plants and the time in the future at which the plant protection product and/or plant growth regulator is effectively available to the plant. For example, the plant protection product and/or plant growth regulator may be of a systemic type and requires absorption by the root system of the plant, transportation to a target tissue, and processing by the target tissue before having its intended effect. The absorption, transportation and processing capacity typically depend on the physiologic state of the plant.

The method for example involves predicting a physiologic state of the plants at a time in the future, using a model of the physiologic state of the plants as a function of time; determining a discrepancy between an estimated physiologic state of the plants at the given time or a time in the past and a theoretic physiologic state of the plants at the given time or said time in the past using said model; and supplying a quantity of plant protection product and/or plant growth regulator to the plant, wherein the quantity is controlled based on the predicted physiologic state of the plants at the time in the future, compensated for the determined discrepancy between the indication of and the theoretic physiologic state of the plants at the given time or said time in the past.

The physiologic state of the plants at a time in the future may be predicted based on a model of the physiologic state of said plants as a function of time. As there may be a discrepancy between actual state of the plant and the theoretic state of the plant based of the model, the method compensates therefor by considering the difference between the indication of the real physiologic state of the plants at the time in the past relative to the given time and the theoretical physiologic state of the plants for said time the past. The indication of the real physiologic state can for example be obtained by measuring, e.g. with one ore more sensors, one or more primary and secondary indices of the physiologic state of the plants, for example a water evaporation rate and/or a water extraction rate of the plants. For example, the one or more sensors may include a humidity sensor, flow sensor, pH sensor, temperature sensor, carbon-dioxide sensor, oxygen sensor, etc. In a particular example, the one or more sensors include a camera, wherein an indication of the real physiologic state of a plant is, e.g. automatedly, determined based on images acquired with the camera. From the camera images various plant parameters can be determined, for instance leaf dimensions, and whether a plant bears fruits or flowers, which parameters can be used to determine the indication of the real physiologic state of the plant.

The physiologic state relates to a biological activity of the plants. The physiologic state can therefore be determined based on a biorhythm of the plant. The physiologic state may particularly be based on a consumption capacity of the plant e.g. as function of time, indicating a capability of the plant to consume plant consumables, such as water, nutrients, carbon dioxide and light. Consumption for example includes absorption, transportation, assimilation, dissimilation, excretion, or other processing of a consumable. It will accordingly be appreciated that the physiologic state of the plants can vary over time, for example cyclically. For example, the consumption capacity of water can vary at a time scale of day, but also at a time scale of an hour, a week, a month, a season, and/or one or more years. Such time variation of consumption capacity of the plants can be an intrinsic attribute of the plants, and may be linked to natural cycles, such as a day-night cycle and the cyclic course of the seasons. The consumption capacity over time may also differ between various consumables and between various plants and plant varieties. A model of consumption capacity of consumables by the plants over time may be experimentally and/or theoretically determined. Such function of consumption capacity of consumables by the plants over time may be compensated for particular environmental circumstances of the plants that have occurred or that are expected to occur, such as heavy rain fall in an open field.

The time difference between the given time and said time in the future may be determined based on a time delay between the given time at which the plant protection product and/or plant growth regulator are supplied to the plant and the time at which the supplied plant protection product and/or plant growth regulator is or becomes effectively available to the plant. For example, there may be a time delay between a supply of a systemic water-based plant protection product and/or plant growth regulator to the substrate in which the plants grow, and the time at which the plants absorbs, with its root system, the water and plant protection product and/or plant growth regulator from the substrate, transport it to a target tissue, and processes it. Also, plant protection products and/or plant growth regulators may include retardants that are arranged to retard a release of an active compound of the plant protection product and/or plant growth regulator. The time delay depends on the type of plant and specific circumstances in which the plants are cultivated. The time delay can be determined experimentally and/or theoretically, for example using a reference field or in a laboratory setting. The skilled person will be able to estimate a value for the time delay, e.g. by changing a supply of water from a first setting to a second setting, and measuring how long it takes the plants to change their rate of transpiration correspondingly. Also, the time delay could be estimated by changing the flow of water from a first setting to a second setting, and measuring how long it takes for the water uptake of the plants to change correspondingly. A plant's water uptake may for instance be calculated as the amount water supplied to the substrate in which the plant is planted, minus the amount of water drained from the substrate. Of the water taken up by the plant, a portion is evaporated by the plant during growth as transpiration, while another portion is retained by the plant, adding to its mass. In many cases the delay may be a predetermined delay that is known for the plants in the conditions in which they are grown before any of the steps of the method of the invention are carried out.

The prediction of the physiologic state of the plants may be based on a biological rhythm of the plants which includes at least one rhythmic component, in particular a circadian rhythm for said plants, a growth cycle component for said plants and/or developmental cycle component for said plant. From the function of the physiologic state of the plants over time, a pattern may be extracted, indicating the rhythmic component. The rhythmic component may be linked to biological rhythms of the environment of the plant, such as a day-night cycle and the cyclic course of the seasons.

The physiologic state of the plants may be based on a circadian rhythm of the plant. The circadian rhythm may be selected from a predetermined circadian rhythm of the plants with respect to one or more of: uptake and release of $CO_2$ by the plants, uptake of water by the plants and transpiration of water by the plants, and/or generation of sugar by the plants.

The circadian rhythm of the plants may be predetermined under conditions different from the actual growth conditions of the plants. For instance, the predetermined circadian rhythm may represent the circadian rhythm of the plants under ideal cultivation conditions. In order to compensate for non-ideal cultivation conditions in reality, the curve may be adjusted, e.g. by stretching or compressing the curve with respect to time, based on measurements obtained from the plant and/or its environment.

The model may include a curve that represents a predetermined circadian rhythm, e.g. a circadian evaporation rhythm, of the plants over said at least 8 hours, preferably at least 24 hours. The circadian rhythm preferably includes a time period, e.g. of at least 4 hours, during which the plants are in the dark. Herein, the plants are defined to be in the dark when the light incident on a horizontal surface at the level of the plants and in the wavelengths between 400 nm and 700 nm has an intensity of less than 30 Watt/m$^2$.

The predicted physiologic state of said plants may be based on at least one water related parameter of said plant, in particular water evaporation, water take up, water retention, a water balance and/or water drain for said plants and/or its substrate.

The indication of the real physiologic state of said plants includes a determination of at least one water related parameter of the plant, in particular water evaporation, water uptake, water retention, a water balance and/or water drain for said plants and/or a substrate that the plants are cultivated on.

The plants may be cultivated in an open field or indoors, e.g. in a greenhouse.

It will be appreciated that plant protection products and/or growth regulators described herein may be systemic-in which the plant protection products and/or plant growth regulator is absorbed by the plant's tissue; contact-, in which the plant protection product and/or plant growth regulator is substantially only present at an exterior surface of the plant; or a combination of systemic- and contact-. Also, the plant protection products and/or plant growth regulators may be curative, preventive or a combination thereof. Further, plant protection products and/or growth regulators may be water-based or oil-based.

It will further be appreciated that the given time may be a time interval or a moment in time, e.g. a current point in time. It will also be appreciated that a plant as referred to herein, may include both an underground portion, e.g. roots, and micro-organisms associated therewith, and an overground portion, e.g. shoots, stem, leaves, fruits, and flowers.

The method can be carried out in a greenhouse having an interior space for cultivating plants. Typically several climate factors can be controlled in a greenhouse. For instance the temperature, humidity and/or $CO_2$ concentration of the air of the interior space can usually be increased or decreased by venting air e.g. by operating a ventilator and/or controlling a degree of opening of windows. The air temperature in a greenhouse can usually be increased by operating heating means to supply heat energy to the interior, e.g. by providing heated air to the interior, by heating the heating pipes in the space, by electrically heating the air and/or by burning fossil fuel in the interior space. Air humidity may be increased by providing more humid air to the interior space and/or by spraying or atomizing water in the greenhouse, and $CO_2$ concentration in the greenhouse can be increased by operating a $CO_2$ generator or a $CO_2$ supply device in the greenhouse.

According to a second aspect the invention provides a system comprising a greenhouse or open field for cultivation of plants, comprising one or more plant protection product feed devices for feeding one or more plant protection products to the plants, and a control apparatus connected to said one or more plant protection product feed devices and configured for controlling said one or more plant protection product feed devices according to a method as described herein. It will be appreciated that the term greenhouse used herein, refers to any system where plants are cultivated substantially indoors, e.g. a roofed structure, irrespective of a light source used for cultivation. It will also be appreciated that the term open field refers to systems where plants are cultivated substantially outdoors, e.g. an unroofed structure.

According to a third aspect, the invention provides a computer readable medium provided with instructions thereon, which, when executed by a computer, cause the computer to carry out a method as described herein. Hence, the method described herein may be a computer-implemented method.

According to a fourth aspect, the invention provides a plant or plant product, e.g. fruits, seeds, flowers, tubers, leaves, of a plant, obtained or obtainable by a cultivation method as described herein. More particular, the fourth aspect relates to a plant that is cultivated using control data that is obtained according to a cultivation method as described herein.

According to a fifth aspect, the invention provides a set of control data for use in a method of cultivating plants as described herein in which a quantity of plant protection product and/or plant growth regulator that is fed to the plants at a given time is controlled using said data, the data being obtained based on a prediction of a physiologic state of the plants at a time in the future relative to the given time, compensated for a difference between an indication of the real physiologic state of the plants at a time in the past relative to the given time and a theoretical physiologic state of the plants for said time the past.

It will be appreciated that any one or more of the above aspects, features and options can be combined. It will be appreciated that any one of the options described in view of one of the aspects can be applied equally to any of the other aspects. It will also be clear that all aspects, features and options described in view of the method apply equally to the system.

BRIEF DESCRIPTION OF THE DRAWINGS

The invention will further be elucidated on the basis of a drawing, in which.

DETAILED DESCRIPTION OF THE DRAWINGS

Figure 1A:
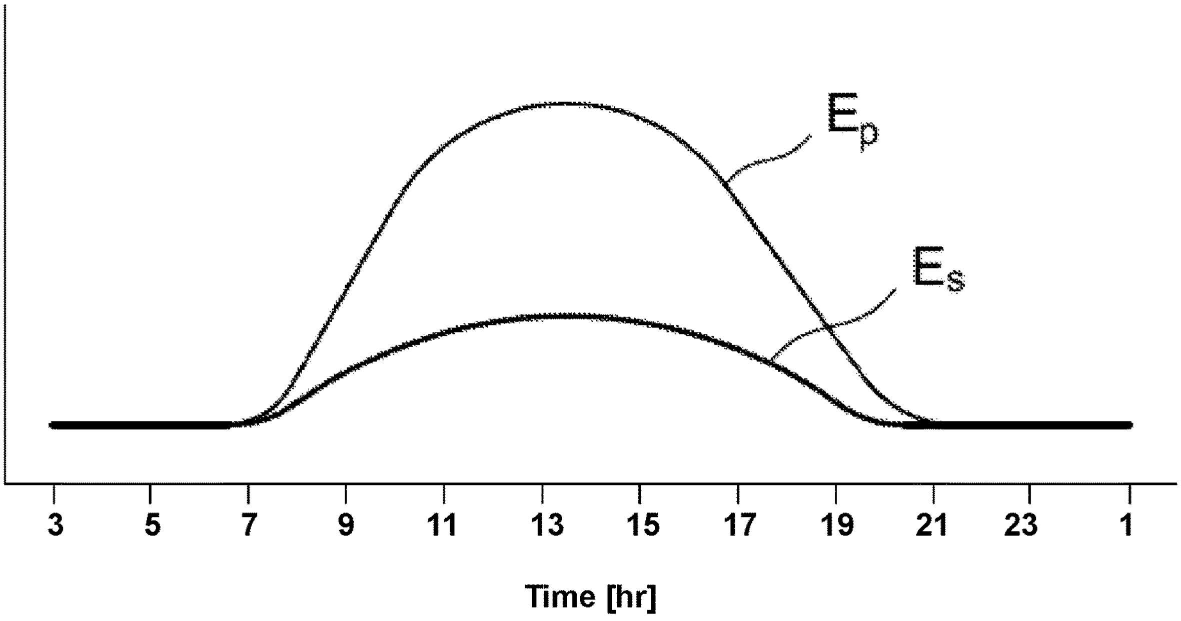
FIGS. 1A and 1B show a circadian rhythm of a cultivated plant.
Figure 1B:
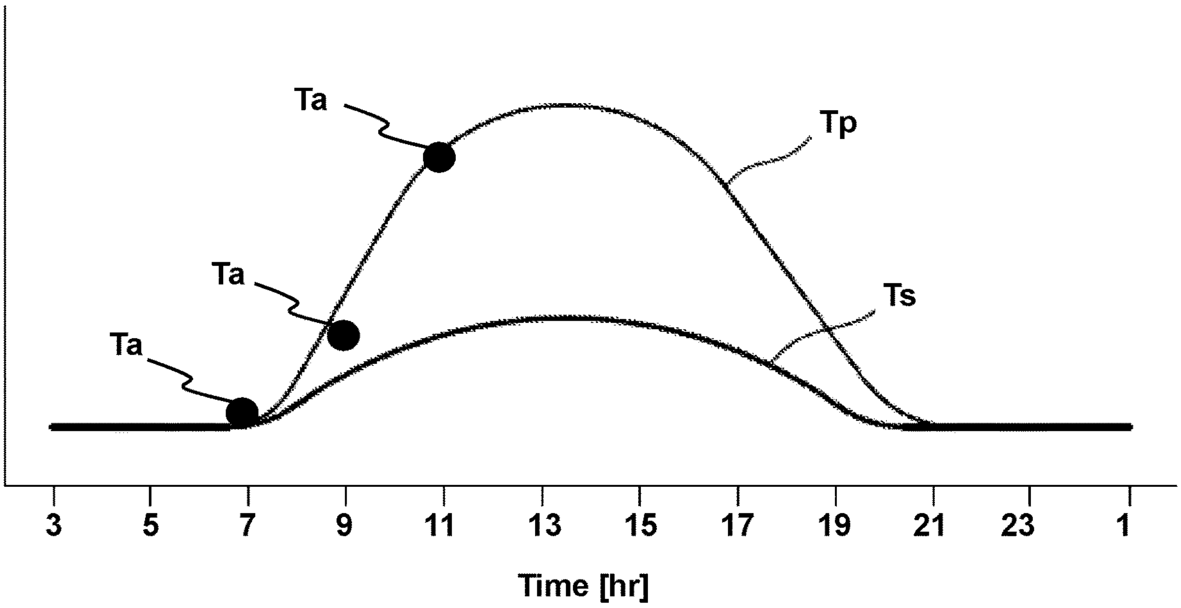

FIGS. 1A and 1B illustrate how the method of the invention may be carried out. FIGS. 1A and 1B particularly illustrate an example a cultivation of plants in a greenhouse. In FIG. 1A shows a model of the circadian rhythm of the plants to be cultivated, wherein curve Ep relates to the circadian transpiration rate of the plants as a function of time during a day, under ideal conditions. Curve Es denotes the circadian transpiration rate of the substrate on which the plants are to be cultivated in absence of any plant as a function of time. The shown circadian curves can be determined experimentally and/or theoretically, for example using a reference field or in a laboratory setting. The curves Ep, Es can be adapted to the particular climatologic and geographic circumstances at the open field where the potato plants are to be cultivated.

It can be seen that the plant transpiration rate has a maximum just after midday. The transpiration rate of the plants can be an indication of a consumption capacity of the plants, and is thus indicative of an activity of the plants. The circadian curves are accordingly a measure for the plants physiologic state during the day. A circadian curve for the plants may be available for each day during a growth season, or the circadian curve may be adjusted for the relevant day of the growth season.

In FIG. 1B, the curve Tp denotes a time delay, as a function of time, between a moment of water supply to the plants, and a moment of water drainage from the plant occurring at a water drainage. Ts denotes a time delay of the substrate, in absence of the plants. As transpiration by the plants may be difficult to measure directly, the time delay between supply and drainage may also provide an indication of a consumption of water by the plants, and hence of physiologic activity of the plants. A large time delay, for example, indicates a high uptake of water from the soil, and thus a high consumption of water by the plant. It is to be noted that the shape of the time-delay curves Tp and Ts are very similar to respectively the evaporation curves Ep and Es. Both the evaporation curves Ep, Es as well as the time-delay curves Tp, Ts are thus indicative of the circadian rhythm of the plant, and accordingly of the plant's activity during the day. It will be appreciated that the curves may be adjusted in accordance with the season, geographic location, meteorological data, etc.

A function of the time delay over time under optimal circumstances can be determined based on the transpiration model of FIG. 1A, indicated by curve Tp. Measurements of the actual time delay can be taken during the day, for example after watering the pants, which are denoted by measurements points Ta.

It is shown in FIG. 1B that from sunrise, at about 07:00, onward, the plants activity increases, which is indicated by the measured increasing time delay, i.e. indicating an increasing water extraction rate water.

The plants may be supplied with plant protection product and/or plant growth regulator at any time. At a given time, for example at 09:00 hr, a quantity of plant protection product and/or plant growth regulator is supplied to the plants. To account for a time delay between supply of the plant protection product and/or plant growth regulator and effective availability thereof to the plant, the quantity of plant protection product and/or plant growth regulator that is fed to the plant should be appropriate to the physiologic state of the plant at a time in the future. As indicated by the curves Ep and Tp, the plant's capacity of water uptake will change during the day, such that the supplied quantity should anticipate for this change accordingly. In this example, the expected time delay between supply and effective availability may be one hour. Hence quantity of supplied plant protection product and/or plant growth regulator should be adapted to the physiologic state of the plants at 10:00 hr. The prediction of the physiologic state of the plants can be based on the curves Ep, Es, Tp, Ts. It will be appreciated that the time delay between supply of plant protection product and plant growth regulator and effective availability thereof to the plant can be determined experimentally and/or theoretically. It will also be appreciated that the time delay between supply and availability may depend on the physiologic activity of the plant.

Further, the quantity of water is compensated for a difference between an indication of the real physiologic state at the given time, or in the past, e.g. as indicated by the measurements Ta, and a theoretical capacity of consumption of the plants at the given time or in the past, e.g. as indicated by curves Tp, Es. At the given time, here 09:00 hr, it is observed from the measurements that the real physiologic state is below the theoretic physiologic state. In other words, the plants' activity is below the theoretically modeled activity, for example due to bad weather conditions. The expected physiologic state at the time in the future, here 10:00 hr, may therefore be adjusted accordingly. Other factors may also be taken into consideration when predicting the physiologic state at a time in the future, such as the weather forecast.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method of cultivating a plant, the method comprising supplying at a given time a quantity of at least one of a plant protection product and plant growth regulator to the plant, wherein said quantity is adapted based on a prediction of a physiologic state of the plant at a time in the future relative to the given time, and is compensated for a difference between an indication of the real physiologic state of the plant at the given time or a time in the past relative to the given time and a theoretical physiologic state of the plant for the given time or for said time the past;

wherein the time in the future is determined based on an estimated time delay between the given time at which the at least one of the plant protection product and the plant growth regulator are supplied to the plant and the time at which the at least one of the plant protection product and the plant growth regulator becomes effectively available.

2. The method of claim 1, wherein the prediction of the physiologic state of the plant is based on a biological rhythm of the plant.

3. The method of claim 1, in which the predicted physiologic state of said plant is based on at least one water related parameter of said plant.

4. The method of claim 1, wherein the at least one of the plant protection product and the growth regulator includes at least at least one of a systemic plant protection product and growth regulator.

5. The method of claim 1, wherein the at least one of the plant protection product and the plant growth regulator is water-based or oil-based.

6. The method of claim 1, in which the plant comprises multiple plants that are cultivated in an open field.

7. The method of claim 6, in which a substrate that the plants are cultivated on includes or is soil.

8. The method of claim 2, wherein the biological rhythm of the plant includes at least one rhythmic component.

9. The method of claim 8, wherein the at least one rhythmic component comprises at least one of a circadian rhythm component for said plant, a growth cycle component for said plant, and a developmental cycle component for said plant.

10. The method of claim 3, wherein the at least one water related parameter of said plant comprises at least one of a water evaporation rate, a water absorption rate, a water retention, a water balance, and a water drain for at least one of said plant and its substrate.

* * * * *